United States Patent
Fukano et al.

(10) Patent No.: US 7,445,163 B2
(45) Date of Patent: Nov. 4, 2008

(54) SUCK BACK VALVE

(75) Inventors: Yoshihiro Fukano, Moriya (JP); Tadashi Uchino, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 513 days.

(21) Appl. No.: 11/167,255

(22) Filed: Jun. 28, 2005

(65) Prior Publication Data

US 2005/0284955 A1  Dec. 29, 2005

(30) Foreign Application Priority Data

Jun. 29, 2004  (JP)  ............................. 2004-191451

(51) Int. Cl.
*B05B 15/02* (2006.01)

(52) U.S. Cl. ........................... 239/119; 239/71; 239/73; 239/106; 239/586; 222/571; 251/30.02; 251/63.5; 251/331

(58) Field of Classification Search .................. 239/119, 239/104, 106, 583, 586, 71, 73, 75; 91/5, 91/6, 41; 417/1, 26; 251/129.04; 141/115–127
See application file for complete search history.

(56) References Cited

U.S. PATENT DOCUMENTS

| | | | | |
|---|---|---|---|---|
| 5,016,687 | A | * | 5/1991 | Kawamura ................... 141/116 |
| 5,429,304 | A | * | 7/1995 | Tomita et al. ................ 239/119 |
| 5,918,810 | A | * | 7/1999 | Fukano et al. ............... 239/119 |
| 5,927,605 | A | * | 7/1999 | Odajima et al. ............. 239/119 |
| 5,931,984 | A | | 8/1999 | Drouart et al. |
| 5,938,119 | A | * | 8/1999 | Yamada et al. ............... 239/119 |
| 5,950,923 | A | * | 9/1999 | Fukano et al. ............... 239/119 |
| 5,950,924 | A | * | 9/1999 | Hatakeyama et al. ......... 239/119 |
| 5,967,414 | A | * | 10/1999 | Fukano et al. ............... 239/119 |
| 5,971,296 | A | * | 10/1999 | Fukano et al. ............... 239/119 |
| 5,979,792 | A | * | 11/1999 | Fukano et al. ............... 239/119 |
| 5,988,524 | A | * | 11/1999 | Odajima et al. ............. 239/119 |
| 5,988,526 | A | * | 11/1999 | Tzeng et al. ................. 239/119 |
| 6,000,629 | A | * | 12/1999 | Tamura et al. ............... 239/119 |
| 6,029,903 | A | * | 2/2000 | Fukano et al. ............... 239/119 |
| 6,056,208 | A | * | 5/2000 | Pirker et al. ................. 239/119 |
| 6,131,820 | A | * | 10/2000 | Dodd ........................... 239/106 |
| 6,176,438 | B1 | * | 1/2001 | Sato et al. ................... 239/119 |

(Continued)

FOREIGN PATENT DOCUMENTS

JP        6-47092        6/1994

(Continued)

OTHER PUBLICATIONS

Pending U.S. Appl. No. 11/165,347, filed Jun. 24, 2005, by Yoshihiro Fukano et al.

*Primary Examiner*—Len Tran
*Assistant Examiner*—Daniel T Sharpe
(74) *Attorney, Agent, or Firm*—Paul A. Guss

(57) ABSTRACT

A suck back valve comprises an ON/OFF valve, a suck back mechanism which includes a second piston connected to a second diaphragm to make displacement integrally and a second spring member fastened to the second piston, a load sensor which detects a load applied by a resilient force of the second spring member corresponding to a pressure of a pilot pressure to be supplied, and a second control unit which detects loads before and after displacement of the second diaphragm by using the load sensor to calculate a displacement amount of the second diaphragm based on a difference between the detected loads.

11 Claims, 5 Drawing Sheets

U.S. PATENT DOCUMENTS

| | | | |
|---|---|---|---|
| 6,200,100 B1 * | 3/2001 | Yang et al. | 417/26 |
| 6,755,354 B2 * | 6/2004 | Fukano et al. | 239/119 |
| 7,143,956 B2 * | 12/2006 | Fukano | 239/119 |
| 2003/0178504 A1 * | 9/2003 | Fukano et al. | 239/119 |
| 2005/0284954 A1 * | 12/2005 | Fukano et al. | 239/119 |
| 2005/0284955 A1 * | 12/2005 | Fukano et al. | 239/119 |

FOREIGN PATENT DOCUMENTS

| | | |
|---|---|---|
| JP | 10-252919 | 9/1998 |

\* cited by examiner

SUCK BACK VALVE

BACKGROUND OF THE INVENTION

1. Field of the Invention

The present invention relates to a suck back valve capable of avoiding, for example, liquid from dripping from a supply port for a pressure fluid by sucking a predetermined amount of the pressure fluid allowed to flow through a fluid passage.

2. Description of the Related Art

A suck back valve has been hitherto used, for example, in the step of producing a semiconductor wafer or the like. The suck back valve functions to avoid so-called liquid dripping which would be otherwise caused such that a minute amount of the coating liquid drips from the supply port to the semiconductor wafer when the supply of the coating liquid to the semiconductor wafer is stopped.

A suck back valve concerning such a conventional technique is shown in FIG. 5 (see Japanese Patent Publication No. 6-47092).

The suck back valve 1 has a main body 5 which is formed with a flow chamber 4 for making communication between an inflow port 2 and an outflow port 3, and a cover 6 which is connected to an upper portion of the main body 5. The inflow port 2 is connected to a supply source (not shown) for a discharge liquid, while the outflow port 3 is connected to an unillustrated nozzle.

An opening 7, which extends in the upward direction, is formed at a substantially central portion of the flow chamber 4. A first diaphragm 8, which partitions the flow chamber 4 at the upper surface in an air-tight manner, is stretched over the opening 7. A vertically movable member 10, which has the lower end allowed to abut against the first diaphragm 8, is arranged in an accommodating chamber 9 which is formed above the first diaphragm 8.

A second diaphragm 11, which is interposed between the main body 5 and the cover 6, is arranged above the vertically movable member 10. The second diaphragm 11 and the vertically movable member 10 are integrally displaceable by the aid of a projection 12 which is caulked to the end of the vertically movable member 10 and which is secured to the second diaphragm 11.

A coil spring 13, which urges the second diaphragm 11 upwardly, is installed between the first diaphragm 8 and the second diaphragm 11. A pressure chamber 15, to which the pilot air is supplied via a pilot air port 14, is formed between the second diaphragm 11 and the cover 6. The cover 6 is provided with a detection unit 17 comprising a detection pin 16 to make abutment against the projection 12 of the vertically movable member 10.

The operation of the suck back valve 1 concerning the conventional technique will be schematically explained below. The pressure of the pressure chamber 15 is high as the pressure is supplied from an unillustrated electropneumatic proportional valve to the pilot air port 14 during the supply of the discharge liquid. The second diaphragm 11 is disposed at the lower position indicated by a two-dot chain line shown in FIG. 5, while resiliently contracting the coil spring 13. The first diaphragm 8, which is operated integrally with the vertically movable member 10, is also disposed at the lower position, and the volume of the flow chamber 4 is decreased.

In such a situation, when the supply source for the discharge liquid is deenergized to stop the discharge from the unillustrated nozzle, then the pilot pressure supplied from the pilot air port 14 is reduced, and the pressure in the pressure chamber 15 is lowered. Therefore, the first diaphragm 8 is moved upwardly integrally with the second diaphragm 11 and the vertically movable member 10 to a state shown by a solid line in FIG. 5. As a result, the first diaphragm 8 is deformed, and the volume of the flow chamber 4 is increased. Accordingly, the discharge liquid contained in the nozzle is sucked.

In this arrangement, the deformation of the first diaphragm 8 corresponds to the vertical movement of the vertically movable member 10, which is detected as the operation of the detection pin 16 of the detection unit 17. A detection signal is derived from the detection unit 17 to an unillustrated instruction unit to perform the feedback control.

However, in the case of the suck back valve 1 concerning the conventional technique as described above, when the displacement amount of the vertically movable member 10 is detected by the aid of the detection pin 16 connected to the detection unit 17, it is difficult to adjust the home position (initial position) of the detection unit 17 because of errors in the attachment position of the first diaphragm 8, for example, due to dispersion of dimensional accuracy concerning individual parts incorporated in the product. Further, the suck back amount is dispersed even when an identical detection signal is obtained, due to dimensional errors caused by the dispersion of the dimensional accuracy.

SUMMARY OF THE INVENTION

A general object of the present invention is to provide a suck back valve which makes it possible to control the suck back amount highly accurately without being affected by dispersion of dimensional accuracy of individual parts.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
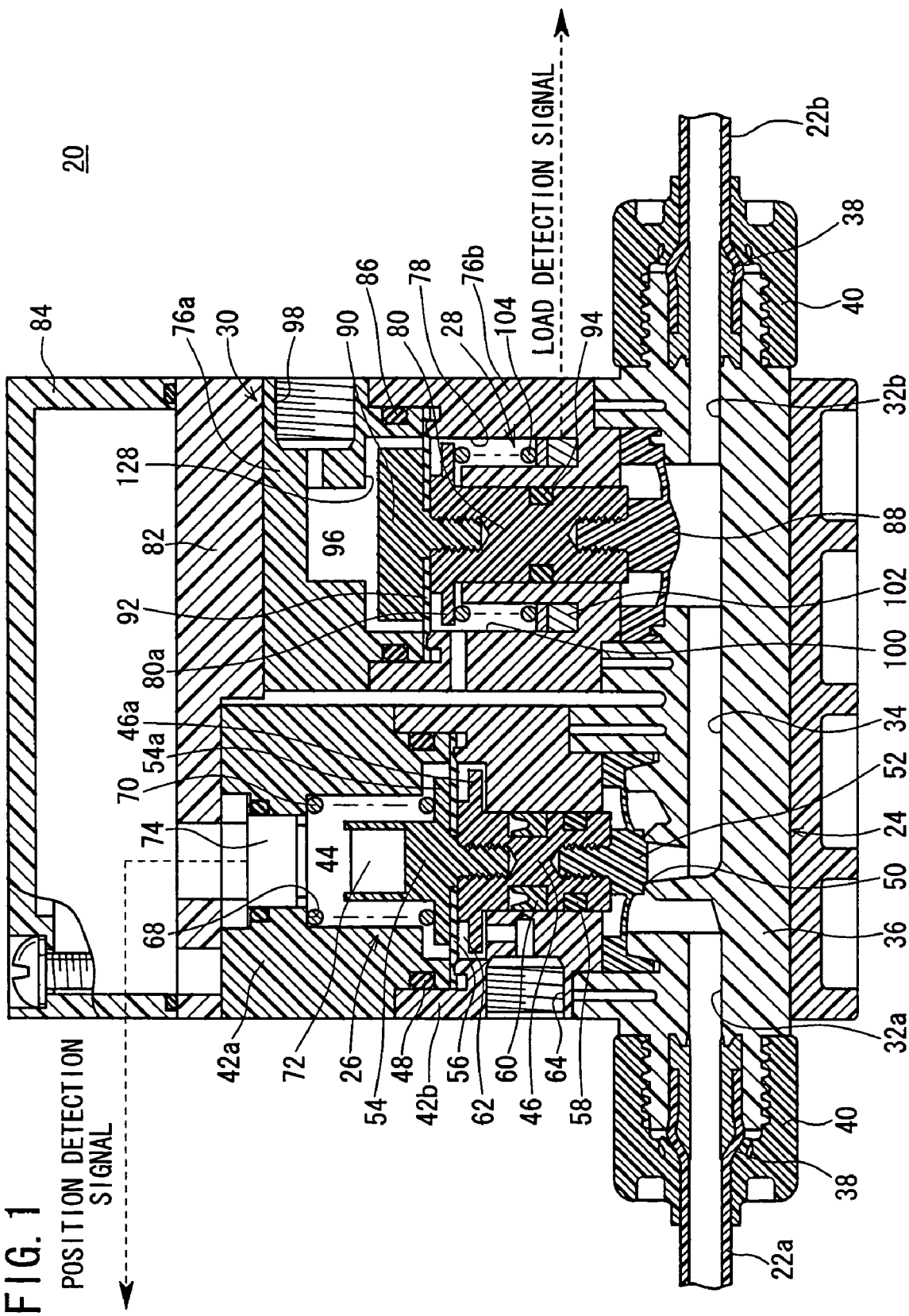
FIG. 1 is a longitudinal sectional view illustrating an arrangement of a suck back valve according to an embodiment of the present invention.

With reference to FIG. 1, reference numeral 20 indicates a suck back valve according to an embodiment of the present invention. The suck back valve 20 comprises a joint section 24 to which a pair of coaxially arranged tubes 22a, 22b are detachably connected while being separated from each other by a predetermined spacing distance, and a valve-driving section 30 which is provided above the joint section 24 and which includes an ON/OFF valve 26 and a suck back mechanism 28 therein.

The joint section 24 includes a joint body 36 which has a first port 32a formed at one end and a second port 32b formed at the other end and which is provided with a fluid passage 34 for making communication between the first port 32a and the second port 32b, inner members 38 which are engaged with the first port 32a and the second port 32b respectively and which are inserted into openings of the tubes 22a, 22b respectively, and lock nuts 40 which retain liquid tightness or air tightness of connecting portions of the tubes 22a, 22b by being screwed into screw grooves which are engraved at the ends of the joint body 36.

The ON/OFF valve 26 is arranged on the joint section 24 disposed closely to the first port 32a. The ON/OFF valve 26 includes a first upper valve body 42a and a first lower valve body 42b which are integrally connected to the joint body 36, and a first piston 46 which is arranged in a first chamber 44 formed in the first upper valve body 42a and the first lower valve body 42b and which is provided displaceably in the vertical direction.

A first seal member 48 is installed to a connecting portion between the first upper valve body 42a and the first lower valve body 42b. Air tightness is retained for the first chamber 44 by means of the sealing action of the first seal member 48.

A valve plug 52, which closes the fluid passage 34 by being seated on a seat section 50, is screwed to one end of the first piston 46 in the axial direction. The valve plug 52 is composed of a thick-walled section which is disposed at a central portion, and a thin-walled section which is formed integrally at a circumferential portion of the thick-walled section. A connecting member 54 is fastened to the other end of the first piston 46 in the axial direction by the aid of a screw section. A first diaphragm 56 is interposed at a connecting portion between the first piston 46 and the connecting member 54.

The first diaphragm 56 is formed to be thin-walled having a flat plate shaped with its circumferential edge portion being interposed by the first upper valve body 42a and the first lower valve body 42b. An O-ring 58 and a packing 60 having a V-shaped cross section are installed to annular grooves on the outer circumferential surface of the first piston 46 respectively.

A cylinder chamber 62, which is closed by the first diaphragm 56 in an air-tight manner, is formed under the first diaphragm 56. The pressure fluid is supplied into the cylinder chamber 62 via a first pressure fluid inlet/outlet port 64 communicating with the cylinder chamber 62. The pressure fluid acts on a flange section 46a which is formed at an upper portion of the first piston 46 to press the first piston 46 in the upward direction. Therefore, the connecting member 54, the first piston 46, and the valve plug 52 are moved upwardly in an integrated manner under the flexible bending action of the first diaphragm 56, and thus the valve plug 52 is separated from the seat section 50 to effect the switching from the valve-closed state to the valve-open state (see FIG. 2).

Figure 2:
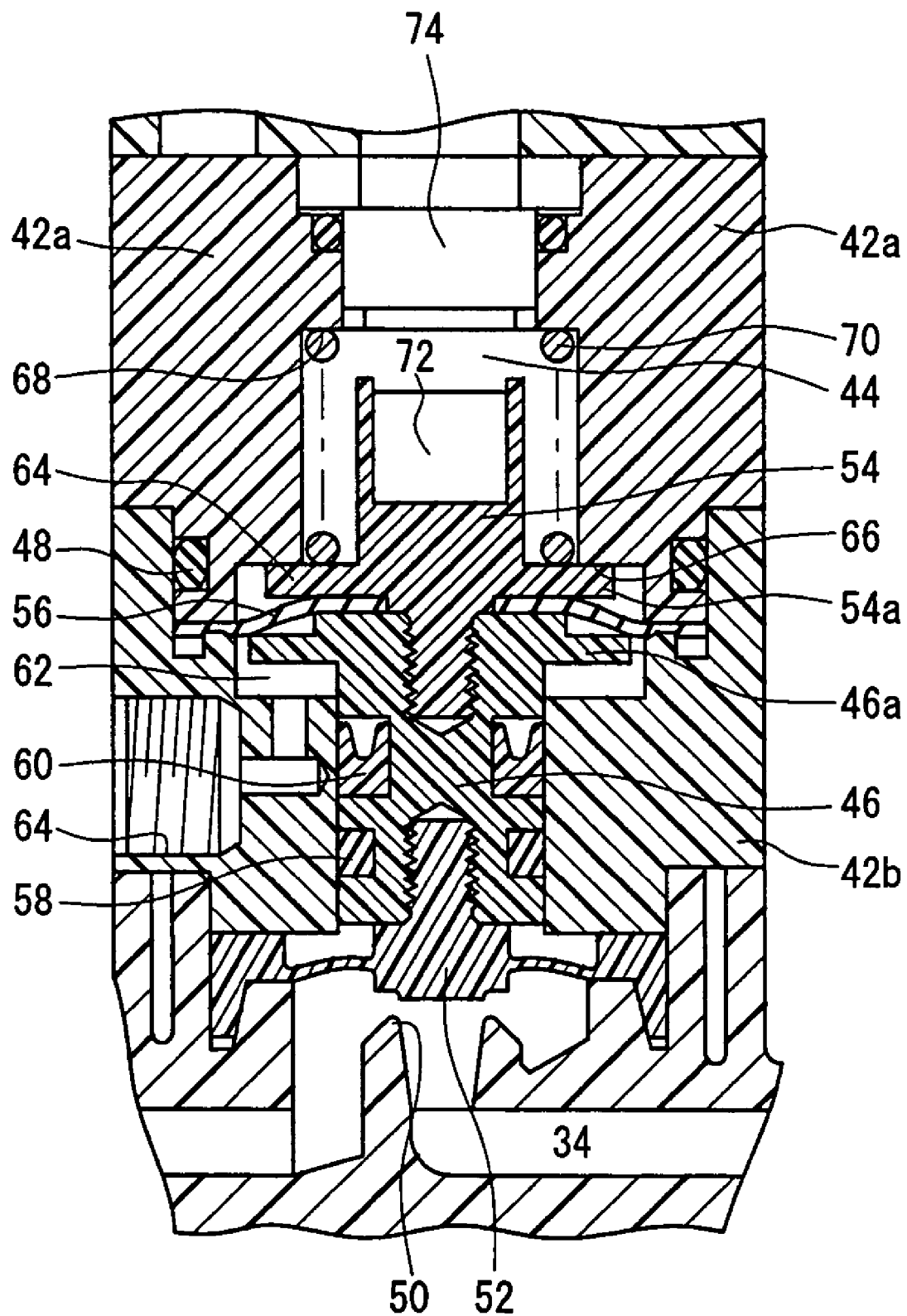
FIG. 2 is a partial magnified longitudinal sectional view illustrating an ON/OFF valve for constructing the suck back valve shown in FIG. 1.

As shown in FIG. 2, a flange section 54a of the connecting member 54, which protrudes radially outwardly, abuts against a wall surface 66 of the first upper valve body 42a, and thus the displacement in the upward direction is regulated.

A first spring member 70, which has one end fastened to the flange section 54a of the connecting member 54 and which has the other end fastened to an annular step 68 of the first upper valve body 42a, is provided in the first chamber 44. The first spring member 70 is provided so that the connecting member 54, the first piston 46, and the valve plug 52 are pressed downwardly by the spring force of the first spring member 70.

A magnet 72 is installed to a recess disposed at the end of the connecting member 54. The flange section 54a abuts against the wall surface 66 of the first upper valve body 42a, and thus the flange section 54a functions as a stopper to regulate the upward movement of the first piston 46.

A position detection sensor 74, which is composed of, for example, a Hall element to detect the position of the first piston 46, is provided for the first upper valve body 42a opposed to the magnet 72 while being separated by a predetermined spacing distance. In this embodiment, the position detection sensor 74 detects the magnetic field of the magnet 72 installed to the end of the connecting member 54. Accordingly, it is possible to detect the valve-open state and the valve-closed state of the ON/OFF valve 26 respectively, and it is possible to derive a position detection signal to a first control unit (see FIG. 4) via an unillustrated lead wire and a connector.

The suck back mechanism 28 is arranged on the joint section 24 disposed closely to the second port 32b. The suck back mechanism 28 includes a second upper valve body 76a and a second lower valve body 76b which are integrally connected to the joint body 36, and a second piston (displacement member) 80 which is arranged in a second chamber 78 formed in the second upper valve body 76a and the second lower valve body 76b and which is provided displaceably in the vertical direction.

The first upper valve body 42a and the first lower valve body 42b of the ON/OFF valve 26, and the second upper valve body 76a and the second lower valve body 76b of the suck back mechanism 28 are assembled integrally by a bonnet 82 and a cover member 84 which are commonly installed respectively.

A second seal member 86 is installed to a connecting portion between the second upper valve body 76a and the second lower valve body 76b. Air tightness of the second chamber 78 is retained by the sealing action of the second seal member 86.

A second diaphragm (flexible member) 88 is connected by a screw section to one end of the second piston 80 in the axial direction. The second diaphragm 88 is composed of a thick-walled section which is disposed at a central portion, and a thin-walled section which is formed integrally at a circumferential portion of the thick-walled section.

A disk-shaped member 90 is fastened by a screw section to the other end of the second piston 80 in the axial direction. A thin-walled third diaphragm 92 having a flat plate shape is interposed between the second piston 80 and the disk-shaped member 90. The third diaphragm 92 has a circumferential edge portion interposed between the second upper valve body 76a and the second lower valve body 76b. An O-ring 94 is installed to an annular groove on the outer circumferential surface of the second piston 80.

A diaphragm chamber 96, which is closed by the third diaphragm 92 in an air-tight manner, is formed over the third diaphragm 92. The pressure fluid is supplied into the diaphragm chamber 96 via a second pressure fluid inlet/outlet port 98 communicating with the diaphragm chamber 96.

An annular groove 100, which has a diameter larger than the diameter of the second piston 80, is formed below the third diaphragm 92. Those arranged in the annular groove 100 include a load sensor 102 which converts the applied load into an electric signal to be derived, and a second spring member (elastic member) 104 composed of a coil spring which has one end fastened to a flange section 80a of the second piston 80, which has the other end fastened to the load sensor 102, and which presses the second piston 80 in the upward direction.

The load sensor 102 functions as a load-detecting mechanism for detecting the load applied by the second spring member 104 and converting the load into the electric signal, corresponding to the pilot pressure supplied into the diaphragm chamber 96. The electric signal is derived to a second control unit via an unillustrated connector as described later on. The load sensor 102 comprises, for example, a strain gauge to utilize the piezoresistance effect such that the resistance value is changed when the strain is applied to an unillustrated resistor composed of, for example, a metal or a semiconductor. A sense current of about 10 μA is applied to the resistor, and the electric signal, which corresponds to the difference in electric potential generated in the resistor due to the applied strain, is outputted.

In this arrangement, the pressure fluid, which is supplied into the diaphragm chamber 96 via the second pressure fluid inlet/outlet port 98, acts on the upper surface portion of the disk-shaped member 90 to press the disk-shaped member 90 in the downward direction. Therefore, the disk-shaped member 90 and the second piston 80 are displaced in an integrated manner in the downward direction against the spring force of the second spring member 104 to a state in which the bottom surface of the thick-walled section of the second diaphragm 88 slightly protrudes toward the fluid passage 34.

The suck back valve 20 according to the embodiment of the present invention is basically constructed as described above. Next, its operation, function, and effect will be explained.

Figure 4:
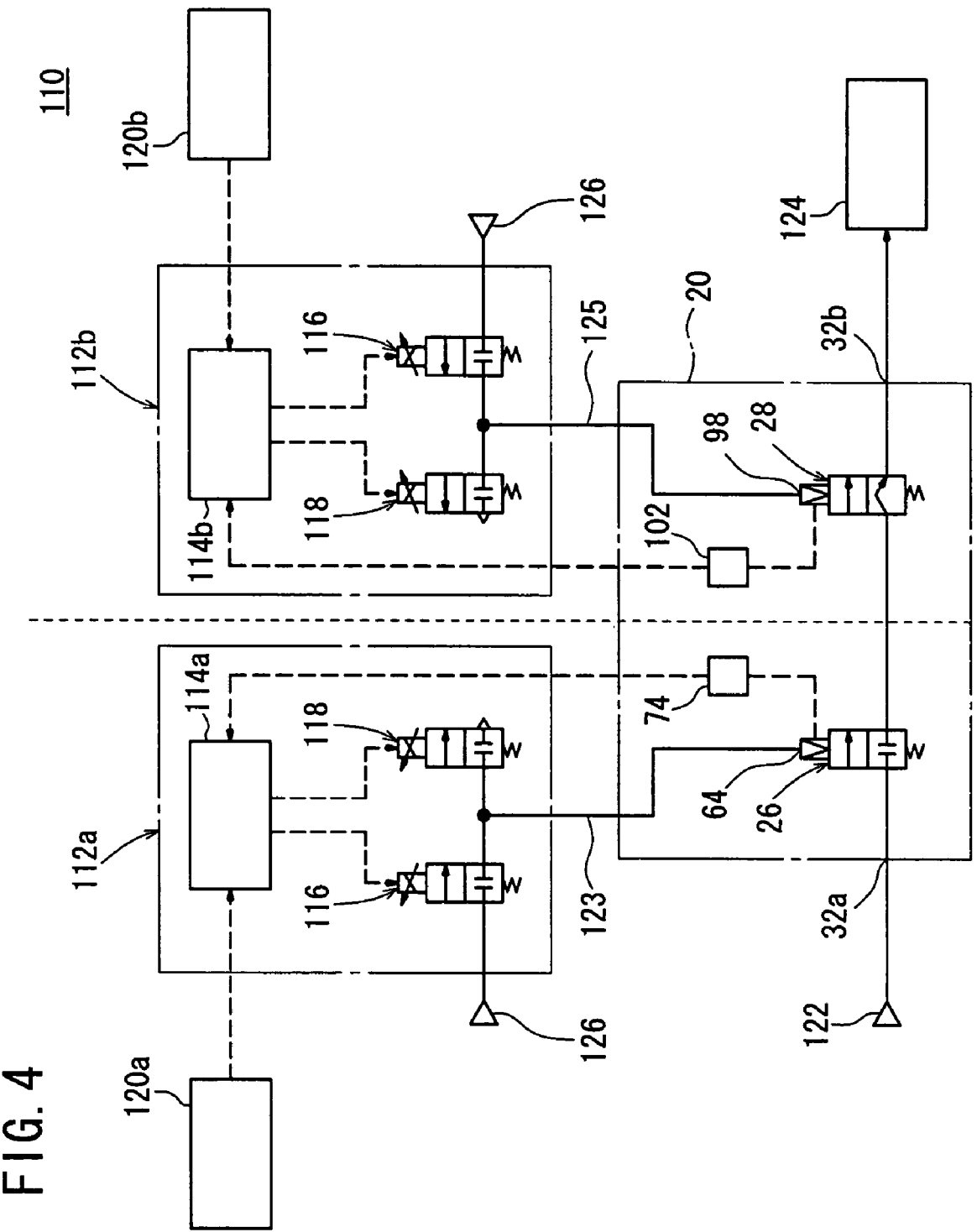
FIG. 4 is a schematic block diagram illustrating a suck back system into which the suck back valve shown in FIG. 1 is incorporated.
Figure 5:
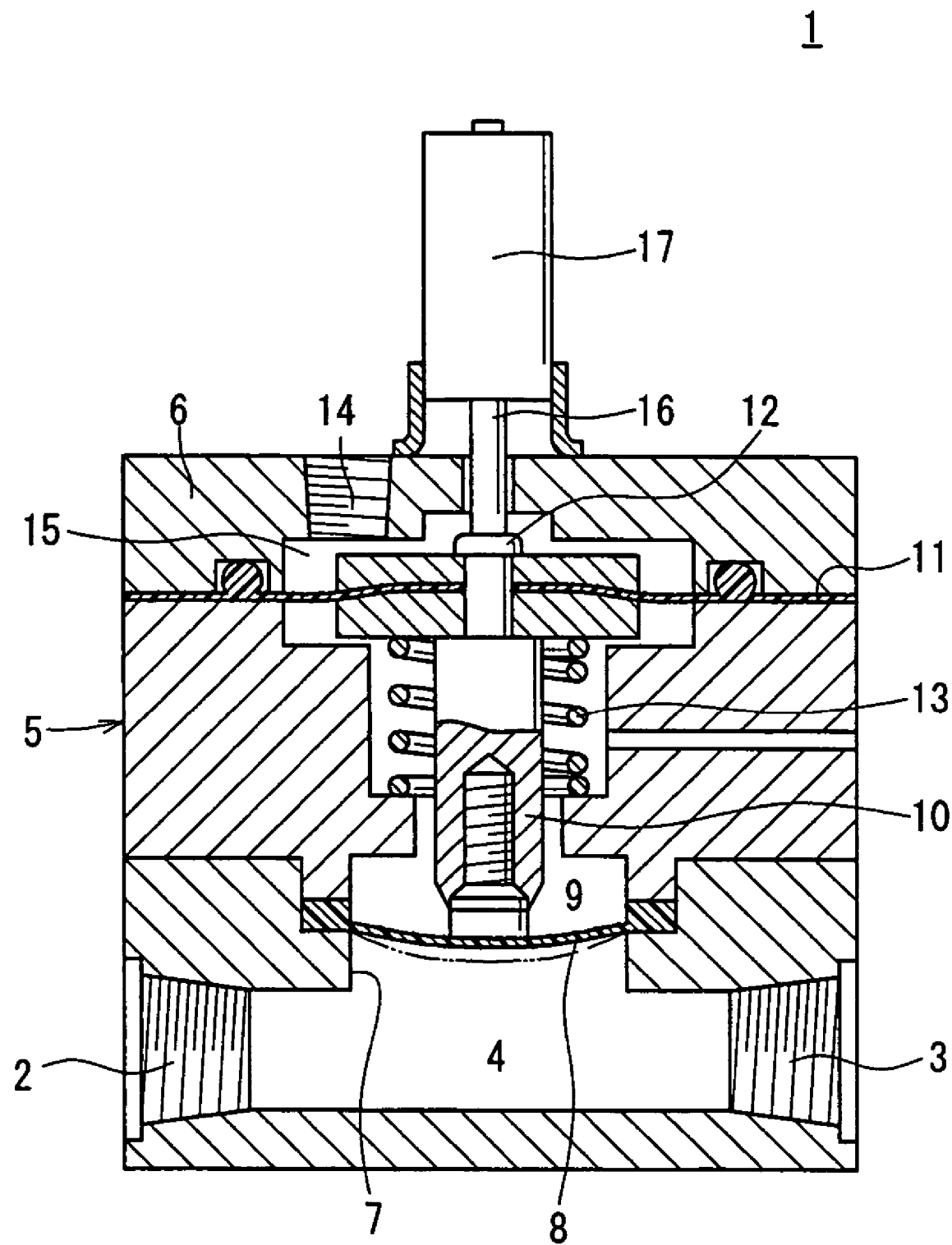
FIG. 5 is a longitudinal sectional view illustrating an arrangement of a suck back valve concerning the conventional technique.

FIG. 4 shows a suck back system 110 into which the suck back valve 20 according to the embodiment of the present invention is incorporated.

The suck back system 110 comprises first and second electropneumatic proportional valves 112*a*, 112*b* which are constructed substantially identically and which output pneumatic pressure signals corresponding to inputted electric signals. The first and second electropneumatic proportional valves 112*a*, 112*b* respectively include first and second control units (control mechanisms) 114*a*, 114*b*, and supplying solenoid-operated valves 116 and discharging solenoid-operated valves 118 of the normally closed type which are energized and deenergized based on instruction signals (ON signals/OFF signals) outputted from the first and second control units 114*a*, 114*b* respectively. First and second data-setting mechanisms 120*a*, 120*b*, which introduce preset signals into the first and second control units 114*a*, 114*b* respectively, are connected to the first and second electropneumatic proportional valves 112*a*, 112*b* respectively.

In this arrangement, a passage 123, which is branched from a communication passage between the supplying solenoid-operated valve 116 and the discharging solenoid-operated valve 118 of the first electropneumatic proportional valve 112*a*, is connected to the first pressure fluid inlet/outlet port 64 of the ON/OFF valve 26. On the other hand, a passage 125, which is branched from a communication passage between the supplying solenoid-operated valve 116 and the discharging solenoid-operated valve 118 of the second electropneumatic proportional valve 112*b*, is connected to the second pressure fluid inlet/outlet port 98 of the suck back mechanism 28.

An unillustrated MPU (microprocessor unit), which functions as respective mechanisms of control, judgment, processing, calculation, and storage, is provided for each of the first and second control units 114*a*, 114*b*. The control signal, which is derived from the MPU, is used to energize and deenergize the supplying solenoid-operated valve 116 and/or the discharging solenoid-operated valve 118. Accordingly, it is possible to control the pilot pressure supplied to each of the cylinder chamber 62 of the ON/OFF valve 26 and the diaphragm chamber 96 of the suck back mechanism 28.

The position detection sensor 74 of the ON/OFF valve 26 is electrically connected to the first control unit 114*a*. The detection signal of the position detection sensor 74 is introduced into the first control unit 114*a*. On the other hand, the load sensor 102 of the suck back mechanism 28 is electrically connected to the second control unit 114*b*. The load detection signal of the load sensor 102 is introduced into the second control unit 114*b*.

A coating liquid supply source 122, in which the coating liquid is stored, is connected to the tube 22*a* communicating with the first port 32*a* of the suck back valve 20. On the other hand, a coating liquid-dripping apparatus 124, which is provided with the nozzle (not shown) for dripping the coating liquid to the unillustrated semiconductor wafer, is connected beforehand to the tube communicating with the second port 32*b*.

After performing the preparatory operation as described above, the pressure fluid supply source 126 is energized to introduce the pressure fluid into the first and second electropneumatic proportional valves 112*a*, 112*b*, and the preset signals are introduced into the first and second control units 114*a*, 114*b* by the aid of the first and second data-setting mechanisms 120*a*, 120*b*. The first control unit 114*a* derives the energizing signal to only the supplying solenoid-operated valve 116 based on the preset signal to allow the supplying solenoid-operated valve 116 to be in the ON state. In this situation, the discharging solenoid-operated valve 118 is deenergized, which is in the OFF state.

Therefore, the pilot pressure, which is introduced into the ON/OFF valve 26 by the aid of the supplying solenoid-operated valve 116, is supplied to the cylinder chamber 62, and the first piston 46 is moved upwardly. Accordingly, the ON/OFF valve 26 is in the ON state.

During this process, the magnetic field of the magnet 72 installed to one end of the first piston 46 is detected by the position detection sensor 74. The position detection signal, which is derived from the position detection sensor 74, is introduced into the first control unit 114*a*. Accordingly, the first control unit 114*a* confirms that the ON/OFF valve 26 is in the ON state.

On the other hand, the second control unit 114*b* derives the energizing signal to only the supplying solenoid-operated valve 116 based on the preset signal to allow the supplying solenoid-operated valve 116 to be in the ON state. In this situation, the discharging solenoid-operated valve 118 is deenergized, which is in the OFF state.

Therefore, the pilot pressure, which is introduced into the suck back mechanism 28 by the aid of the supplying solenoid-operated valve 116, is supplied to the diaphragm chamber 96. The disk-shaped member 90 and the second piston 80 are displaced downwardly against the spring force of the second spring member 104 to a state in which the second diaphragm 88 slightly protrudes toward the fluid passage 34.

In this situation, the load sensor 102, which is provided for the suck back mechanism 28, detects the load (strain amount) which is applied by the pressure of the pilot pressure supplied to the diaphragm chamber 96 while being pressed by the spring force of the second spring member 104. A first load detection signal, which is derived from the load sensor 102, is introduced into the second control unit 114*b*. The load, which is applied to the load sensor 102 via the spring force of the second spring member 104, is increased or decreased correspondingly to the pressure of the pilot pressure supplied to the diaphragm chamber 96.

The coating liquid, which is supplied from the coating liquid supply source 122 in the state in which the ON/OFF valve 26 is in the ON state and the second diaphragm 88 of the suck back mechanism 28 slightly protrudes toward the fluid passage 34 as described above, flows along the fluid passage 34. The coating liquid is dripped onto the semiconductor wafer by the aid of the coating liquid-dripping apparatus 124. As a result, a coating film (not shown) having a predetermined film thickness is formed on the semiconductor wafer.

After a predetermined amount of the coating liquid is applied to the unillustrated semiconductor wafer by the aid of the coating liquid-dripping apparatus 124, the supplying solenoid-operated valve 116 and/or the discharging solenoid-operated valve 118 is appropriately energized or deenergized by using the control signal derived from the unillustrated MPU of the first control unit 114a. Accordingly, the pilot pressure, which is supplied to the cylinder chamber 62 of the ON/OFF valve 26, is decreased to allow the ON/OFF valve 26 to be in the OFF state.

That is, when the pilot pressure, which is supplied to the cylinder chamber 62 of the ON/OFF valve 26, is decreased to be zero, then the first piston 46 is displaced downwardly under the action of the spring force of the first spring member 70, and the valve plug 52 is seated on the seat section 50. The first control unit 114a confirms that the ON/OFF valve 26 is in the OFF state by detecting, with the position detection sensor 74, the magnetic field of the magnet 72 displaced integrally with the first piston 46 and introducing the position detection signal into the first control unit 114a.

Therefore, the ON/OFF valve 26 is in the OFF state, and the fluid passage 34 is blocked. Accordingly, the supply of the coating liquid to the semiconductor wafer is stopped to interrupt the dripping state of the coating liquid from the nozzle of the coating liquid-dripping apparatus 124 to the semiconductor wafer. In this situation, the coating liquid just before dripping onto the semiconductor wafer remains in the nozzle of the coating liquid-dripping apparatus 124. Therefore, liquid dripping may occur undesirably.

Accordingly, the second control unit 114b derives the deenergizing signal to the supplying solenoid-operated valve 116 of the second electropneumatic proportional valve 112b to allow the supplying solenoid-operated valve 116 to be in the OFF state, simultaneously with which the second control unit 114b derives the energizing signal to the discharging solenoid-operated valve 118 to allow the discharging solenoid-operated valve 118 to be in the ON state.

Therefore, the supply of the pilot pressure is stopped for the diaphragm chamber 96 of the suck back mechanism 28, and the pressure of the pilot pressure in the diaphragm chamber 96 is decreased to be zero. Accordingly, the second piston 80 is moved upwardly under the action of the spring force of the second spring member 104. In this situation, the disk-shaped member 90, which is displaced integrally with the second piston 80, has the upper surface section which abuts against the wall surface 128 formed on the second upper valve body 76a. Accordingly, the upward displacement is regulated.

Figure 3:
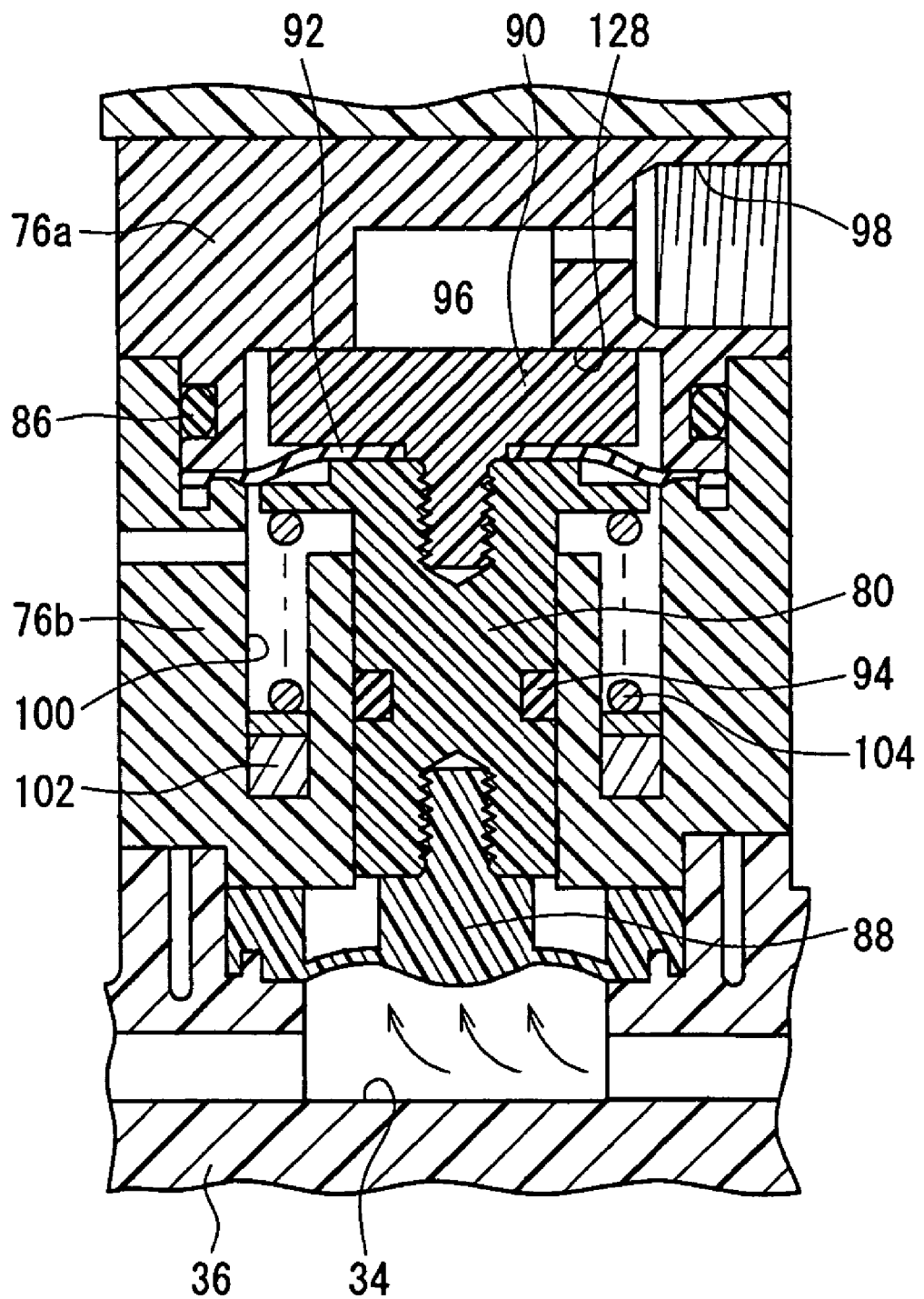
FIG. 3 is a partial magnified longitudinal sectional view illustrating a suck back mechanism for constructing the suck back valve shown in FIG. 1.

Therefore, the second diaphragm 88, which is connected to one end of the second piston 80, is displaced integrally, and thus the negative pressure action is generated. In this situation, a predetermined amount of the coating liquid contained in the fluid passage 34 is sucked in the direction indicated by the arrows shown in FIG. 3. As a result, the predetermined amount of the coating liquid, which remains in the nozzle of the coating liquid-dripping apparatus 124, is sucked toward the suck back valve 20. Accordingly, it is possible to prevent the semiconductor wafer from suffering any liquid drips.

When the pressure of the pilot pressure is decreased, and the second spring member 104 is moved upwardly, then the load sensor 102 detects the load (strain amount) applied by the second spring member 104. A second load detection signal, which is derived from the load sensor 102, is introduced into the second control unit 114b. The second control unit 114b is operated such that the first load detection signal, which is derived from the load sensor 102 in the state in which the second diaphragm 88 slightly protrudes toward the fluid passage 34, is compared with the second load detection signal which is derived from the load sensor 102 in the state in which the second diaphragm 88 is moved upwardly in order to calculate the displacement amount of the second diaphragm 88 from the difference between the first load detection signal and the second load detection signal.

When the energizing signal is derived from the first control unit 114a to allow the ON/OFF valve 26 to be in the ON state, simultaneously with which the energizing signal is derived from the second control unit 114b to the supplying solenoid-operated valve 116 to give the ON state, and the deenergizing signal is derived to the discharging solenoid-operated valve 118 to give the OFF state, then the initial state is established. The dripping of the coating liquid onto the semiconductor wafer is then started.

In the embodiment of the present invention, when the second piston 80 is displaced integrally with the second diaphragm 88, then the load, which is applied by the second spring member 104 corresponding to the pressure of the pilot pressure, is detected by the load sensor 102, and the displacement amount of the second diaphragm 88 is calculated in accordance with the difference of the load.

As a result, in the embodiment of the present invention, the load, which is changed in proportion to the displacement amount of the second diaphragm 88, is detected by the load sensor 102, and thus it is possible to highly accurately control the suck back amount without being affected by the dispersion of the dimension of individual parts and errors in the attachment position even when the dimension of the parts is dispersed as in the conventional technique to cause, for example, errors in relation to the attachment position of the second diaphragm 88.

Although certain preferred embodiments of the present invention have been shown and described in detail, it should be understood that various changes and modifications may be made therein without departing from the scope of the appended claims.

What is claimed is:

1. A suck back valve comprising:

a joint section which has a fluid passage and which includes a first port formed at one end and a second port formed at the other end;

an ON/OFF valve which opens and closes said fluid passage by means of a valve plug displaceable in accordance with a pilot pressure;

a suck back mechanism which includes a displacement member displaceable in accordance with a pilot pressure, a flexible member connected to said displacement member to make displacement integrally, and an elastic member fastened to said displacement member and which sucks a pressure fluid contained in said fluid passage under a negative pressure action of said flexible member;

a load-detecting mechanism which detects a load applied by a resilient force of said elastic member corresponding to a pressure of said pilot pressure to be supplied; and a control mechanism which detects loads before and after displacement of said flexible member by using said load-detecting mechanism to calculate a displacement amount of said flexible member based on a difference between said detected loads, wherein said load-detecting mechanism comprises a load sensor which converts said applied load into an electric signal, and said elastic member is composed of a spring member which has one end fastened to said displacement member and another end fastened to said load sensor.

2. The suck back valve according to claim 1, wherein said spring member has said one end fastened to a flange section formed on said displacement member.

3. The suck back valve according to claim 2, wherein said load sensor is composed of a strain gauge having a resistor whose resistance value is changed when any strain is applied.

4. The suck back valve according to claim 2, wherein said load sensor is arranged in an annular groove which is provided at a portion disposed closely to said displacement member.

5. The suck back valve according to claim 1, wherein said control mechanism is composed of a control unit which is provided for an electropneumatic proportional valve.

6. The suck back valve according to claim 1, wherein a suck back system, in which said suck back valve is incorporated, is provided, and said suck back system comprises a first electropneumatic proportional valve which includes a first control unit having a supplying solenoid-operated valve and a discharging solenoid-operated valve electrically connected thereto, and a second electropneumatic proportional valve which includes a second control unit having a distinct supplying solenoid-operated valve and a distinct discharging solenoid-operated valve electrically connected thereto.

7. The suck back valve according to claim 6, further comprising a passage which is branched from a communication passage between said supplying solenoid-operated valve and said discharging solenoid-operated valve of said first electropneumatic proportional valve, wherein said passage communicates with a first pressure fluid inlet/outlet port of said ON/OFF valve, and said pilot pressure is supplied to said ON/OFF valve.

8. The suck back valve according to claim 6, further comprising a passage which is branched from a communication passage between said supplying solenoid-operated valve and said discharging solenoid-operated valve of said second electropneumatic proportional valve, wherein said passage communicates with a second pressure fluid inlet/outlet port of said suck back mechanism, and said pilot pressure is supplied to said suck back mechanism.

9. The suck back valve according to claim 6, wherein a position detection sensor for detecting a position of said valve plug of said ON/OFF valve is electrically connected to said first control unit, and said load sensor is electrically connected to said second control unit.

10. The suck back valve according to claim 1, wherein said ON/OFF valve is provided with a position detection sensor for detecting a position of said valve plug.

11. The suck back valve according to claim 10, wherein said position detection sensor detects a valve-open state and a valve-closed state of said ON/OFF valve respectively by detecting a magnetic field of a magnet installed to a connecting member connected to said valve plug.

* * * * *